Dec. 1, 1931.  M. G. ZINSITZ  1,834,234
TIRE INFLATING DEVICE
Filed May 28, 1930  2 Sheets-Sheet 1

Inventor
M. G. Zinsitz
By Lacey & Lacey, Attorneys

Dec. 1, 1931.   M. G. ZINSITZ   1,834,234
TIRE INFLATING DEVICE
Filed May 28, 1930    2 Sheets-Sheet 2
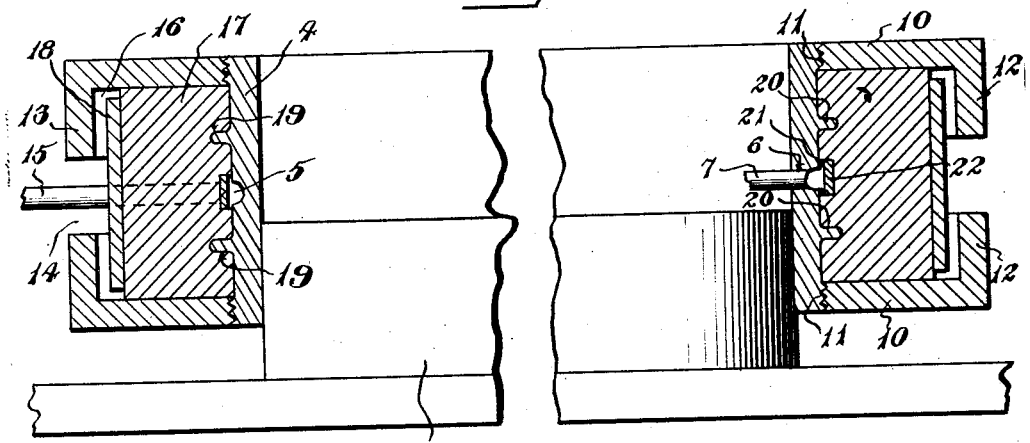
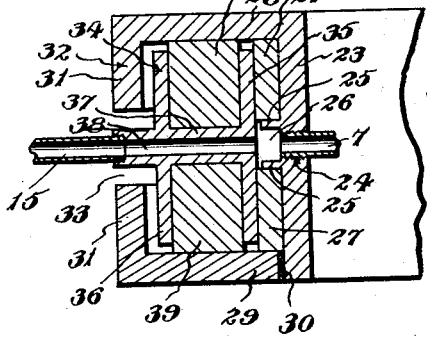
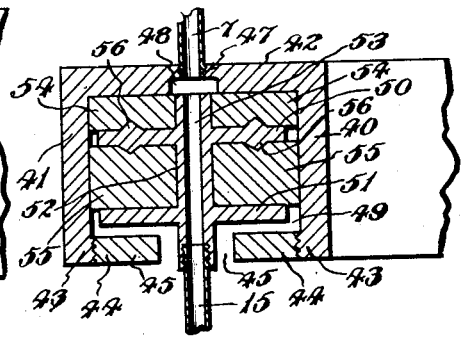
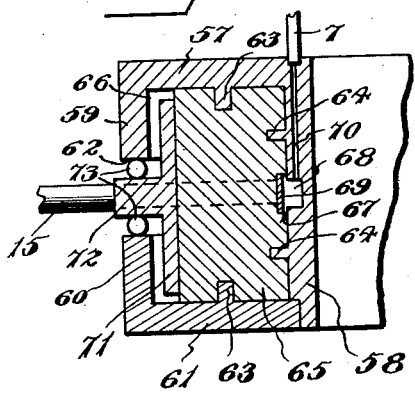
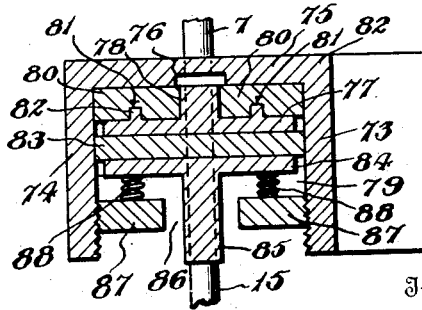
Inventor
M. G. Zinsitz
By Lacey & Lacey, Attorneys Patented Dec. 1, 1931

1,834,234

UNITED STATES PATENT OFFICE

MATTHEW G. ZINSITZ, OF BROOKFIELD, WISCONSIN

TIRE INFLATING DEVICE

Application filed May 28, 1930. Serial No. 456,623.

This invention relates to tire inflating devices and more particularly to a drum adapted to be mounted upon a brake drum or wheel of a vehicle so that air may be delivered from a source of supply to a pneumatic tire carried by the wheel while the vehicle is in motion or standing still.

One object of the invention is to provide a device of this character which may form a part of a tire inflating apparatus of the type disclosed in my prior Patent No. 1,788,699 issued January 13, 1931, wherein air is to be pumped through tubes or pipes leading from the instrument board of an automobile, areoplane or other vehicle to drums mounted upon wheels of the vehicle and delivered from the drums through pipes attached to the inflating stems of tires.

Another object of the invention is to so form the drum that when it is applied to a wheel or brake drum the casing or body portion of the drum may turn with the wheel and a filler be held stationary or the drum held stationary and the filler allowed to turn with the wheel.

Another object of the invention is to provide a drum for the purpose set forth having such construction that the filler and packing may be easily disposed within the drum during assemblage and danger of leakage during inflation of a tire prevented.

Another object of the invention is to so dispose packing within the circumferentially extending chamber of the drum that air may be prevented from passing out of a pocket formed therein except through a pipe leading to a tire to be inflated and further to prevent danger of the packing obstructing the air receiving pocket.

The invention is illustrated in the accompanying drawings, wherein

Figure 1:
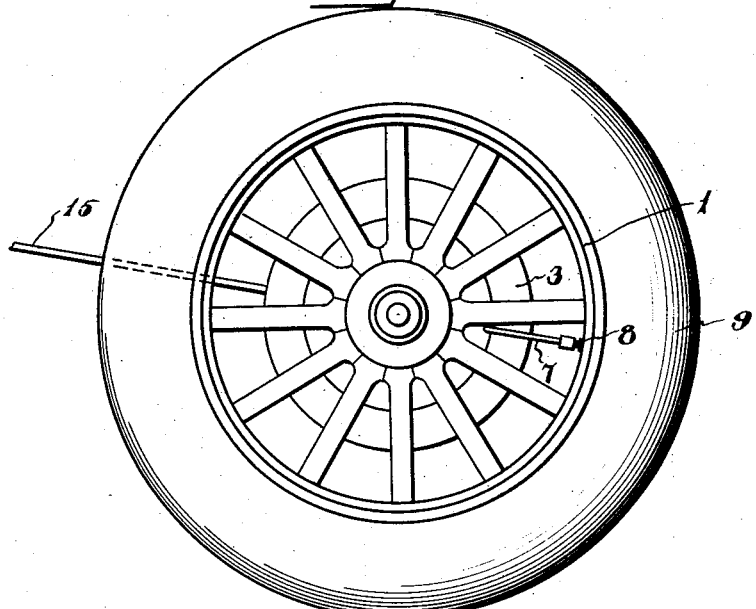
Figure 2:
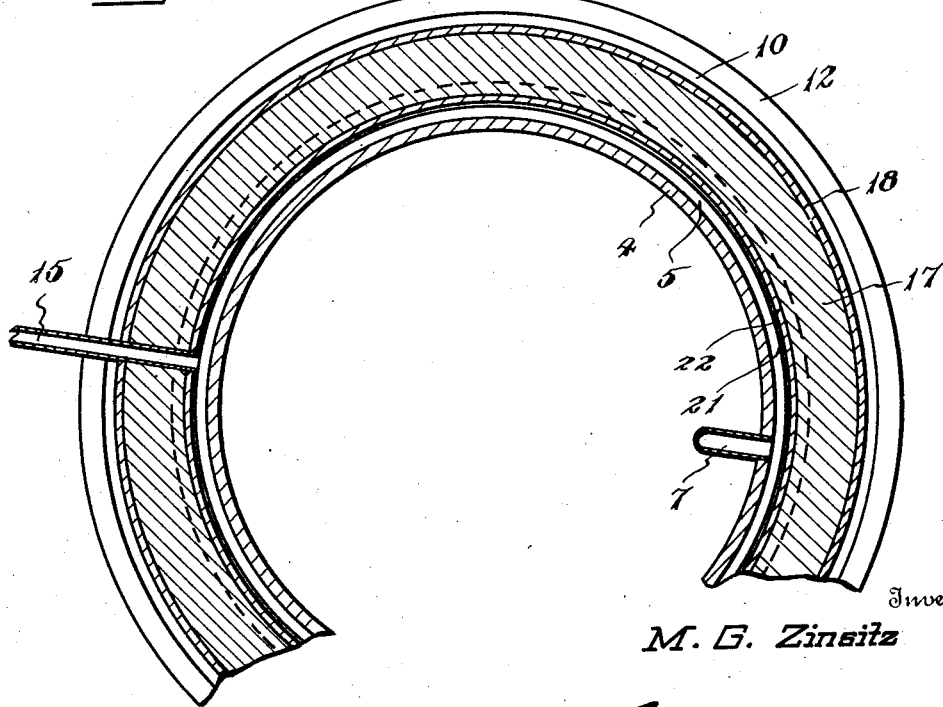

Figure 1 is a view in elevation showing the improved drum applied to a vehicle wheel, Fig. 2 is an enlarged sectional view through the drum.

Fig. 3 is a sectional view taken diametrically through the drum and showing the drum applied to a brake shoe of a wheel, Fig. 4 is a fragmentary sectional view through a modified form of drum, Fig. 5 is a similar view through another modified form of drum, Fig. 6 is a sectional view taken transversely through another modified form of drum, and Fig. 7 is a sectional view through another modified form of drum.

This improved drum which forms part of a tire inflating apparatus may be secured against the spokes of a wheel 1 or about a brake drum 2, as shown in Figure 3, and, in fact, it may be secured about an axle casing or to any other suitable support upon a vehicle so that the drum may rotate with the wheel and a filler within the drum held stationary relative to the drum or the drum held stationary and the filler allowed to rotate with the wheel. This improved drum, which is indicated in general by the numeral 3, may be constructed, as shown in Figures 2 and 3 or as shown in the modified forms illustrated in Figures 4 through 7.

Referring to Figures 2 and 3, it will be seen that the drum consists of an annular body having a main band or ring 4 in the outer face of which is formed a circumferentially extending groove or pocket 5. A port 6 is formed through the ring to receive a pipe or tube 7 through which air is to pass from the pocket to the valve controlled inflating stem 8 of a pneumatic tire 9 carried by the wheel 1. Rings 10 forming side walls of the drum are threaded into engagement with the band 4, as shown at 11, and these rings 10 are formed with flanges 12 which project toward each other but terminate in spaced relation to each other and cooperate to form an outer annular wall 13 having a circumferentially extending slot 14. By this arrangement a plate 15 leading from a suitable source of compressed air or having one end passed through an instrument board of an automobile or aeroplane for engagement by a pump operated by the driver of the vehicle may extend into the drum through the slot 14 and the drum may have rotary motion without interference by the tube or pipe 15. It will be obvious that, if desired, the pipe 15 may be connected with the inflating neck or stem of the tire and the pipe 7 extended to the instrument board or source of compressed air.

The drum defines a circumferentially extending chamber 16 with which the slot 14 communicates and within this chamber is disposed a thick packing ring or band 17 surrounded by a metal band 18 which is split and must be expanded in order to be disposed about the packing. Therefore, this ring or band has a tendency to contract after it has been applied and compresses the packing so that it will be held firmly against the main ring or inner wall 4 of the drum. Grooves 19 are formed in the inner circumferentially extending face of the packing to receive ribs or beads 20 which project from the wall 4 and prevent the packing from having movement transversely in the chamber. Between the grooves 19 is formed a circumferentially extending groove or recess 21 which registers with but is of greater width than the pocket 5 and in this groove is disposed a spacing ring 22 which serves to prevent the packing from being forced into the pocket 5 and obstructing the pocket. The pipe 15 extends through the compressing ring 18 and packing with its inner end engaged through the spacing ring 22 for communication with the pocket 5 and, therefore, air may be forced through the pipe 15 into the pocket and flow through the pocket to the pipe 7 through which it passes to the inflating stem of the pneumatic tire. While the packing fits snugly in the chamber and prevents leakage of air from the pocket 5 through the chamber and slot 14, this packing is permitted to have movement circumferentially in the chamber. Therefore, the drum and the packing together with the cooperating rings or bands 18 and 22 may have rotary movement relative to each other and the packing may be held stationary while the drum rotates with the wheel.

The drum illustrated in Figure 4 is a modified construction. This drum has an inner circumferentially extending wall 23, corresponding to the inner wall 4, and is formed with an opening 24 to receive one end of the pipe 7. Ribs 25 which extend circumferentially about the wall 23 define an air receiving channel or pocket 26 and also serve to hold packing rings 27 firmly against side walls 28 and 29 of the drum. The wall 28 is formed integral with the inner wall 23 whereas the wall 29 has threaded engagement with the inner wall so that it may be removed when repairs or replacements are necessary. Flanges 31, which correspond to the flanges 12, project toward each other from the walls 28 and 29 to form an outer wall 32 having a circumferentially extending slot 33. The filler shown in this figure consists of a split ring 34 having inner and outer bands or sections 35 and 36 joined by a circumferentially extending web 37 which projects outwardly into the slot 33 and this web is drilled, as shown at 38, to form an air passage adapted to receive one end of the pipe 15 so that air may pass from the pipe into the pocket 26. Packing rings 39 are provided at opposite sides of the web 37 between the inner and outer bands 35 and 36 to bear against the side walls 28 and 29 of the chamber in order to prevent escape of air, and it should be noted that the packing rings 27 are of greater depth than the flanges 25 so that the inner band 35 will be prevented from contacting with the flanges when the packing 27 is compressed.

In the modified form illustrated in Figure 5, the drum has its inner and outer walls 40 and 41 joined by a rigid side wall 42 and at the opposite side of the drum from the wall 42 the inner and outer walls are internally threaded, as shown at 43, in order to receive threaded rings 44 which are spaced from each other and cooperate to form a side wall 45 having a circumferentially extending slot 46. The pipe 7 is engaged in a threaded opening 47 to communicate with a circumferentially extending pocket 48 corresponding to the pocket 5. The filler which is passed into the chamber 49 of the drum when the rings 44 are removed consists of inner and outer bands 50 and 51 joined by a web 52 which projects outwardly beyond the outer band into the slot 46 and is drilled, as shown at 53, to form an air passage having its outer end threaded for engagement by one end of the pipe 15. Packing rings 54 are disposed at opposite sides of the web between the band 50 and the wall 42 of the drum and other packing rings 55 are disposed between the bands 50 and 51 at opposite sides of the web. These packing rings bear firmly against the side wall 42 and inner and outer walls 40 and 41 of the drum and are formed with recesses to receive beads 56 formed upon the band 50 in order to prevent the packing rings and bands from slipping transversely of each other. Therefore, the web will be retained in operative relation to the pocket 48 and air can pass freely through the passage 53 into the pocket.

The form of drum illustrated in Figure 6 is somewhat similar to that illustrated in Figures 3 and 4. In this form of the invention the side wall 57 is formed integral with the inner wall 58 and carries a flange 59 which together with the flange 60 of a removable side wall 61 forms an outer side wall having a slot 62. Ribs 63 and 64 project from the side walls and inner wall to engage in grooves formed in a packing ring 65 and hold the packing in place while at the same time allowing the packing to have movements circumferentially in the chamber 66 of the drum. A recess 67, corresponding to the recess 21, is formed in the inner face of the packing to register with an air pocket 68 formed in the inner wall and within the recess 67 is disposed a ring or band 69, corresponding to the band 22, and serving to prevent the packing from working into and obstructing the air pocket. The outlet passage 70 with which the pipe 7 is connected leads from the pocket 68 transversely through the inner wall instead of radially thereof and may be formed at any point desired about the circumference of the drum. The binding ring or band 71, which corresponds to the band 18, fits tightly about the packing and is formed with an outstanding rib 72 which projects through the slot 62. Bearing balls 73 are disposed between the flange 72 and walls of the slot throughout the circumference of the drum in order to cause the drum and band to turn readily relative to each other. Alined openings are formed through the band 69 and flange of the band 71 so that the pipe 15 may pass through these bands and radially through the packing with its inner end communicating with the air pocket 68.

In Figure 7, there has been illustrated an embodiment of the invention of the general type disclosed in Figure 5. In this form the inner and outer walls 73 and 74 are joined by a side wall 75 formed integral therewith and this side wall is formed with a circumferentially extending groove 76, corresponding to the groove or pocket 48, and with which the pipe 7 communicates. A band 77 formed with a side flange 78 fits within the chamber 79 of the drum with its side flange disposed to register with the air pocket and at opposite sides of the flange are disposed packing rings 80. These packing rings bear against the inner surfaces of the walls of the chamber and have their faces which bear against the band 77 formed with grooves 81 to receive ribs 82 projecting from the band. By this arrangement the band will be retained in proper position for its flange to register with the air pocket. After the band 77 has been set in place, a packing ring 83 is fitted into the chamber against this band and a ring or band 84 is then set in place. This band 84 is formed with a side flange 85 projecting outwardly through a slot 86 defined by rings 87 which have threaded engagement with the walls 73 and 74 of the drum and alined openings are formed through the bands 77 and 84 and their flanges in order to receive the pipe 15. A suitable number of springs 88 are disposed between the band 84 and wall forming rings 87, and it will be readily understood that by rotating these rings in order to move them inwardly or outwardly tension of the springs may be controlled and the amount of pressure applied by the springs regulated.

It is to be understood that in each embodiment of the invention the outside or inside of the drum can be any desired shape, such as V-shaped, U-shaped, square, rectangular or any other shape desired and that the inlet and outlet may be located wherever found desirable.

Having thus described the invention, I claim:

Tire inflating means comprising an annular drum formed with a circumferentially extending chamber, said drum having inner and outer walls and a side wall formed integral therewith, a circumferentially extending pocket being formed in the side wall, the other side of the drum being open and the portions of the inner and outer walls adjacent thereto being threaded, rings threaded into engagement with the inner and outer wall and spaced from each other to form a circumferentially slotted side wall, a filler in said chamber rotatable therein and serving to prevent air escaping from the pocket through the chamber and slotted side wall, said filler consisting of inner and outer bands, a web extending from the inner band to said pocket, packing rings at opposite sides of said web, ribs extending from the inner band and engaged in grooves formed in said rings to prevent transverse movement, a packing ring between said bands, a web extending from the outer band through the slot of the outer side wall, springs between the outer band and the rings forming the slotted wall and tensioned by adjusting the wall forming rings, and tubes communicating with said pocket one through the integral side wall and the other through the filler and slotted side wall whereby air may be fed from a source of supply through one tube into the pocket and pass from the pocket through the other tube to a tire to be inflated while relative rotation is taking place between the drum and the filler.

In testimony whereof I affix my signature.

MATTHEW G. ZINSITZ. [L. S.]